Figure 1:
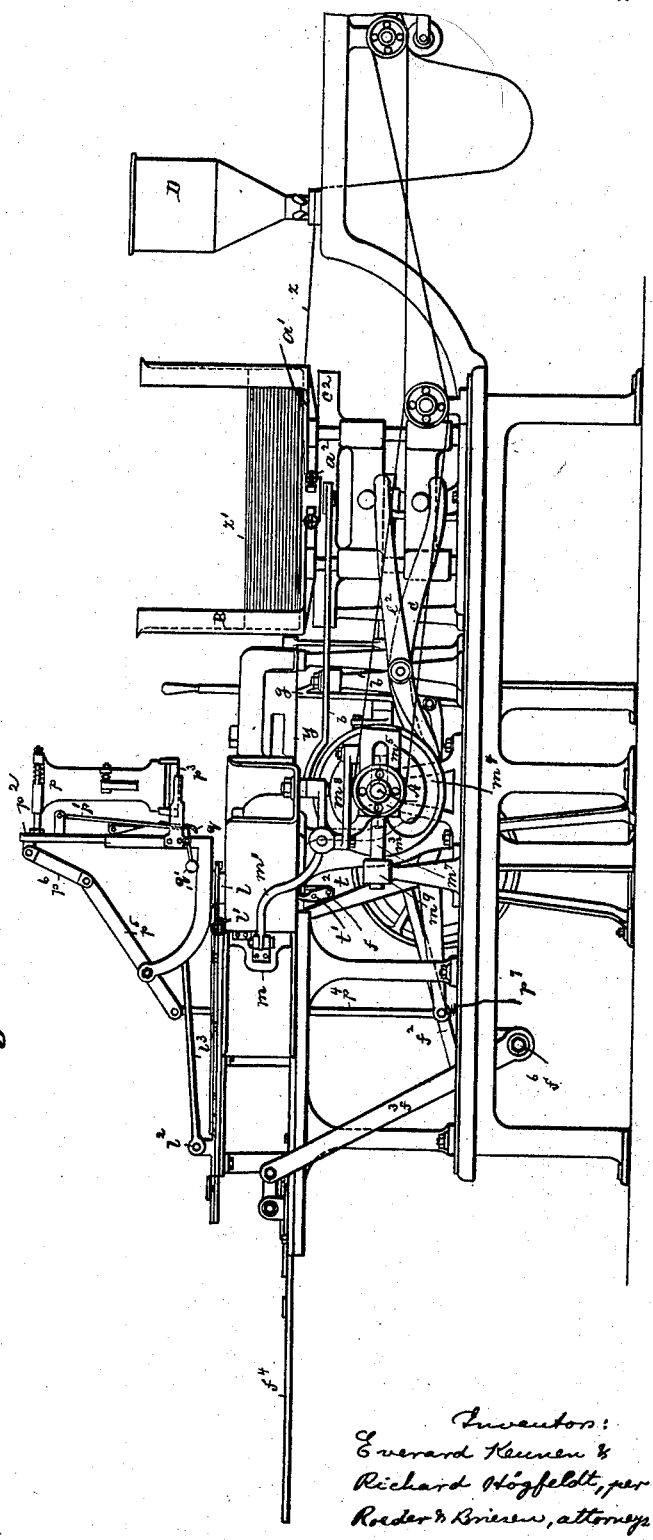

No. 608,201. Patented Aug. 2, 1898.
E. KEUNEN & R. HÖGFELDT.
BOX MAKING MACHINE.
(Application filed Mar. 11, 1897.)

(No Model.) 9 Sheets—Sheet 1.

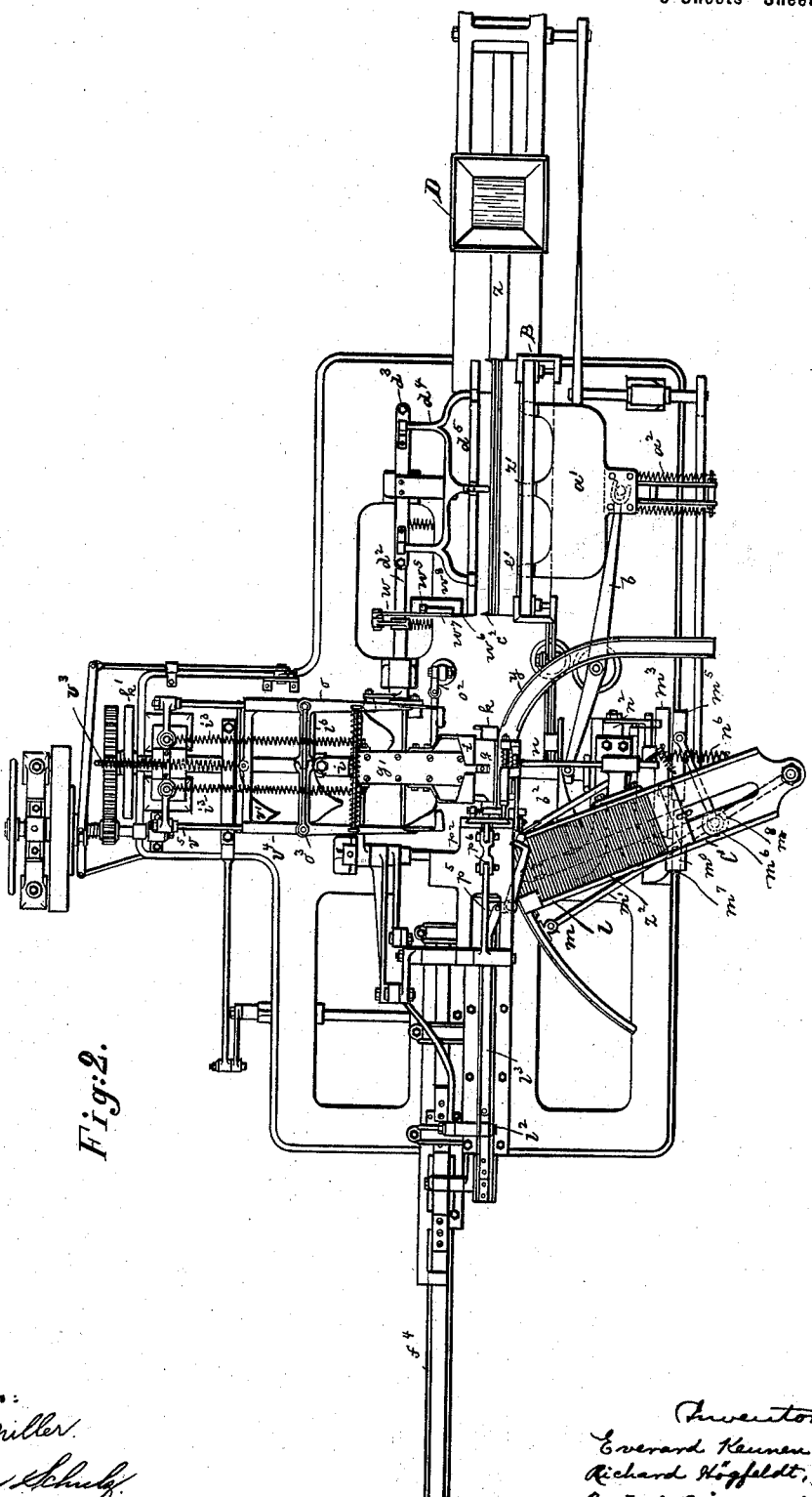

No. 608,201. Patented Aug. 2, 1898.
E. KEUNEN & R. HÖGFELDT.
BOX MAKING MACHINE.
(Application filed Mar. 11, 1897.)
(No Model.)
9 Sheets—Sheet 3.
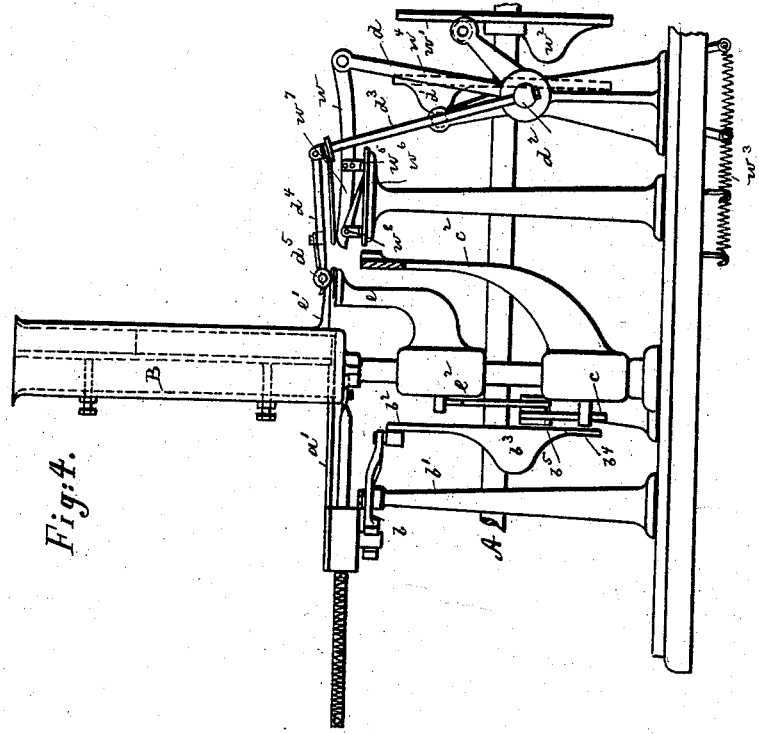
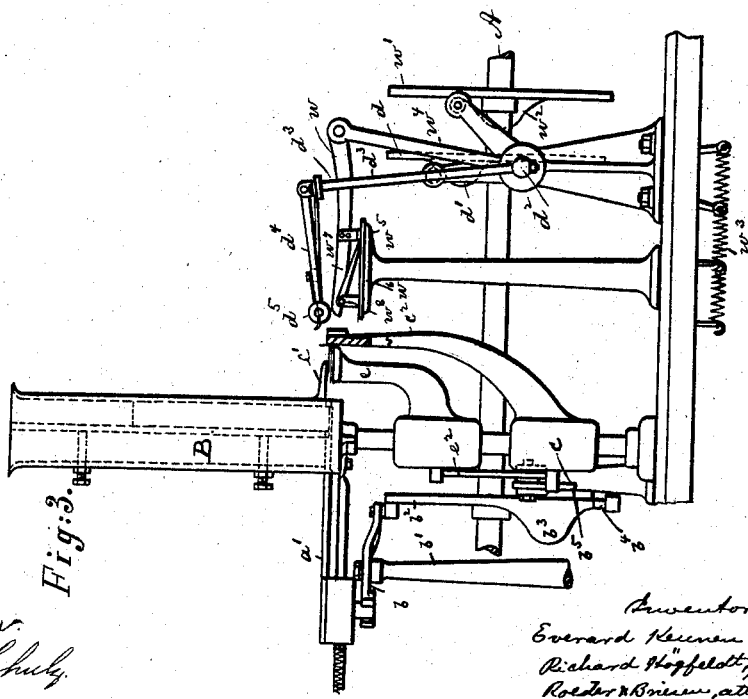

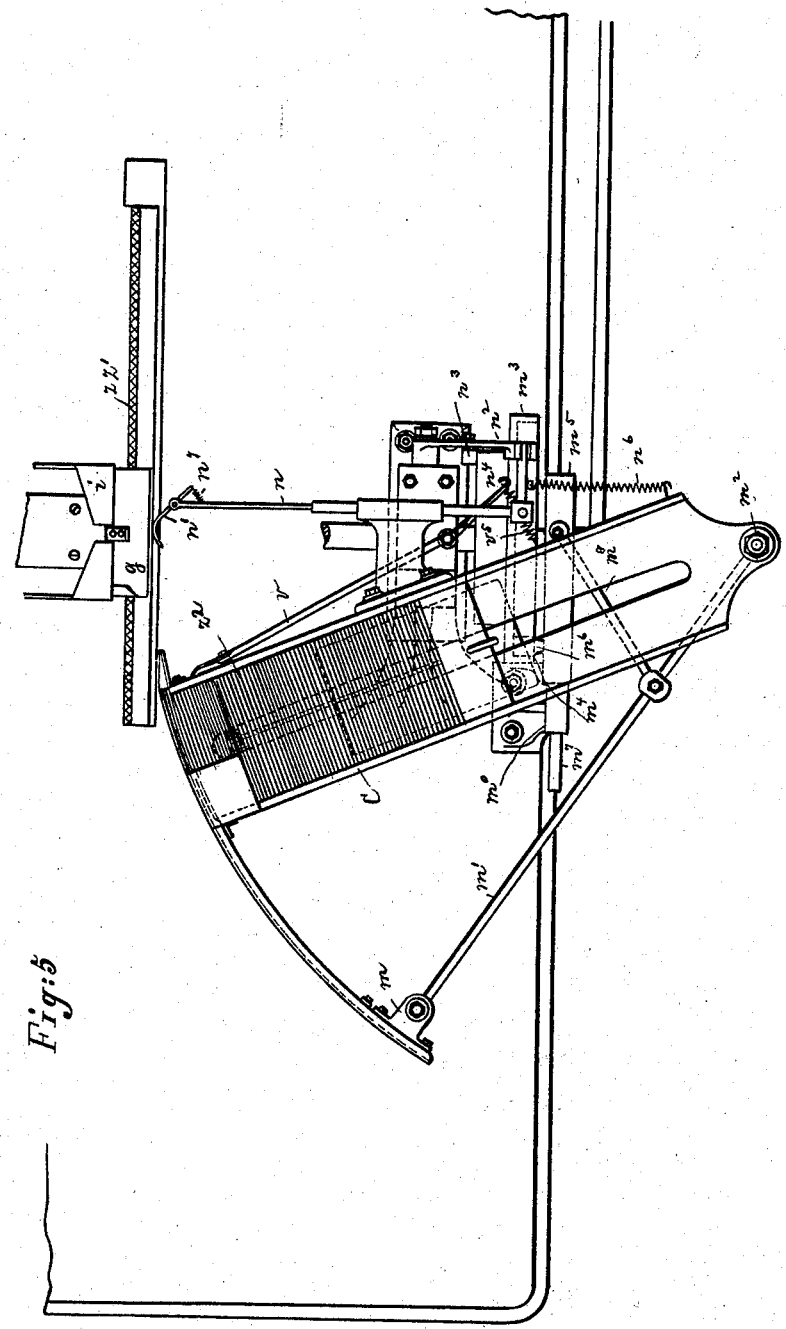

No. 608,201. Patented Aug. 2, 1898.
E. KEUNEN & R. HÖGFELDT.
BOX MAKING MACHINE.
(Application filed Mar. 11, 1897.)

(No Model.) 9 Sheets—Sheet 5.

Witnesses:
William Miller
William Schulz

Inventors:
Everard Keunen &
Richard Högfeldt, per
Roeder & Briesen, attorneys

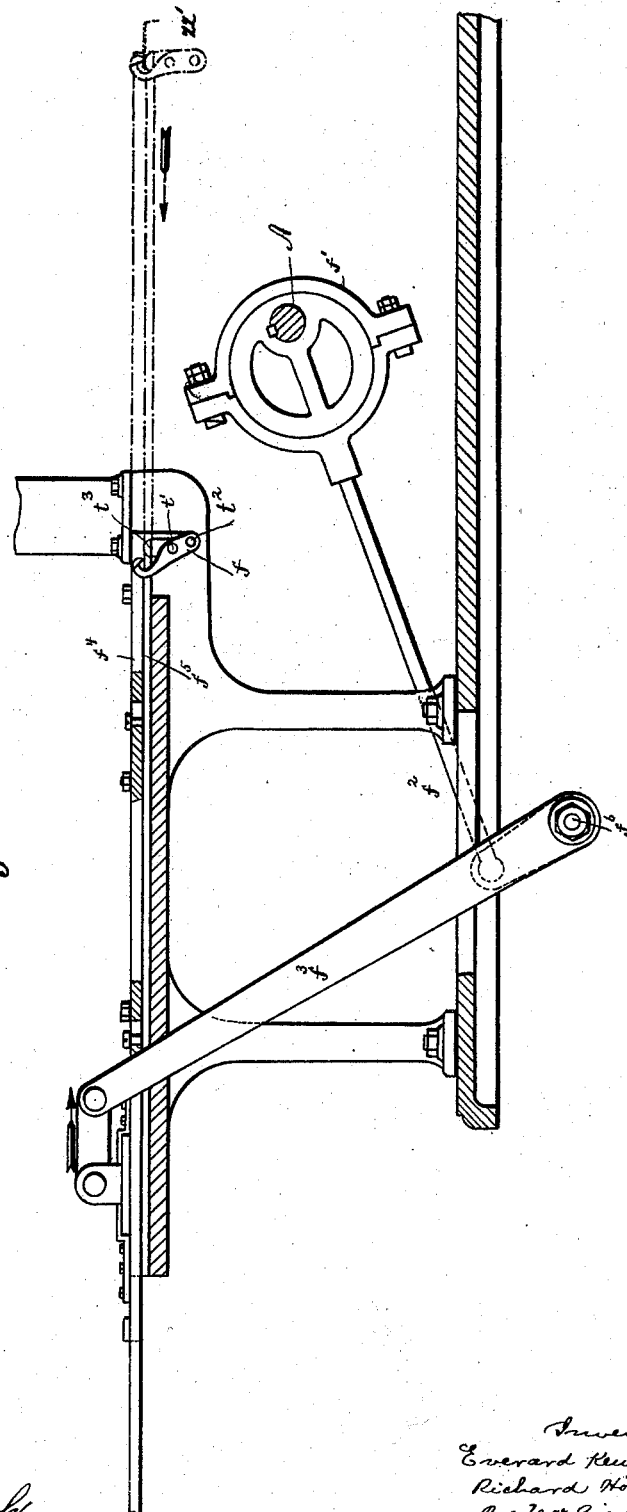

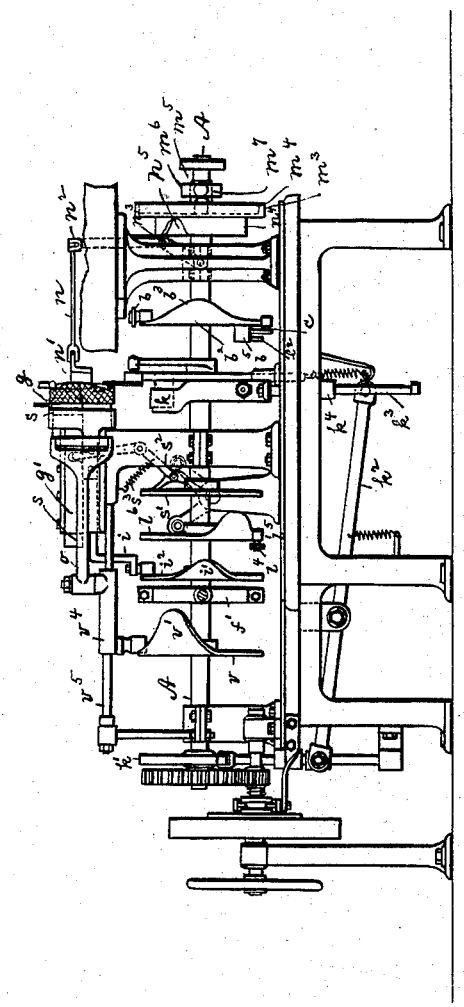

No. 608,201. Patented Aug. 2, 1898.
E. KEUNEN & R. HÖGFELDT.
BOX MAKING MACHINE.
(Application filed Mar. 11, 1897.)
(No Model.) 9 Sheets—Sheet 8.
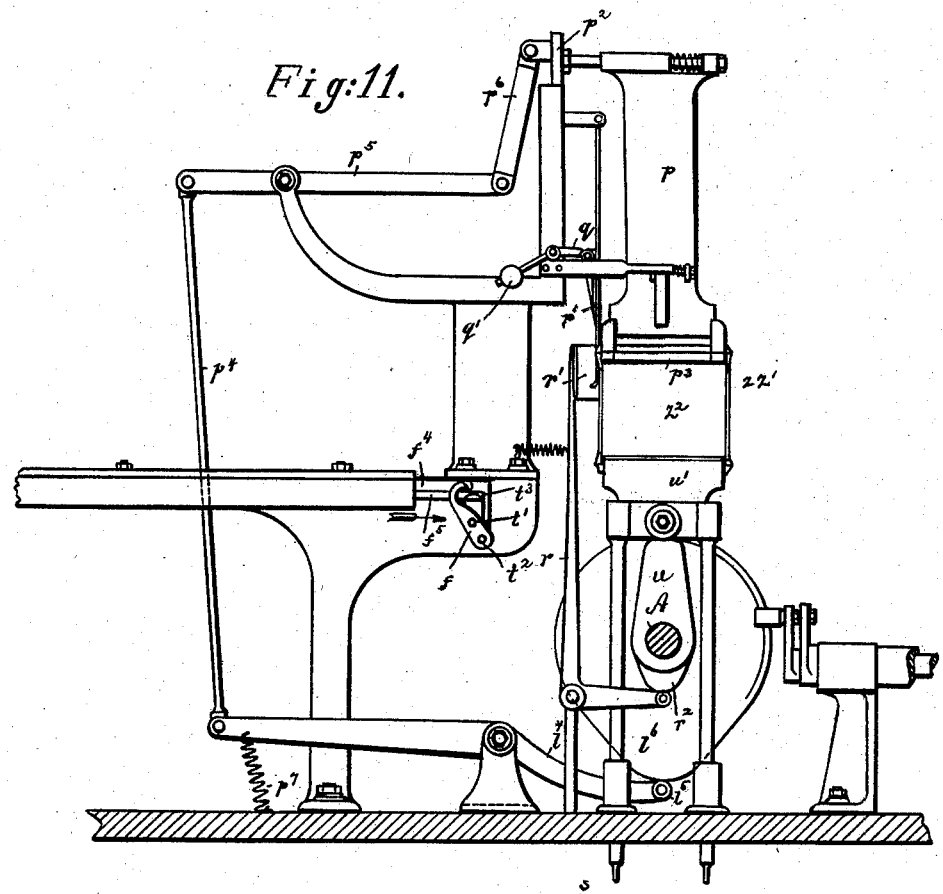

No. 608,201. Patented Aug. 2, 1898.
E. KEUNEN & R. HÖGFELDT.
BOX MAKING MACHINE.
(Application filed Mar. 11, 1897.)
(No Model.) 9 Sheets—Sheet 9.
Fig:15.
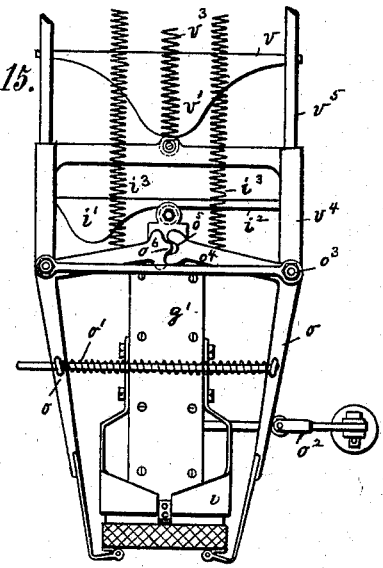
Fig:16.
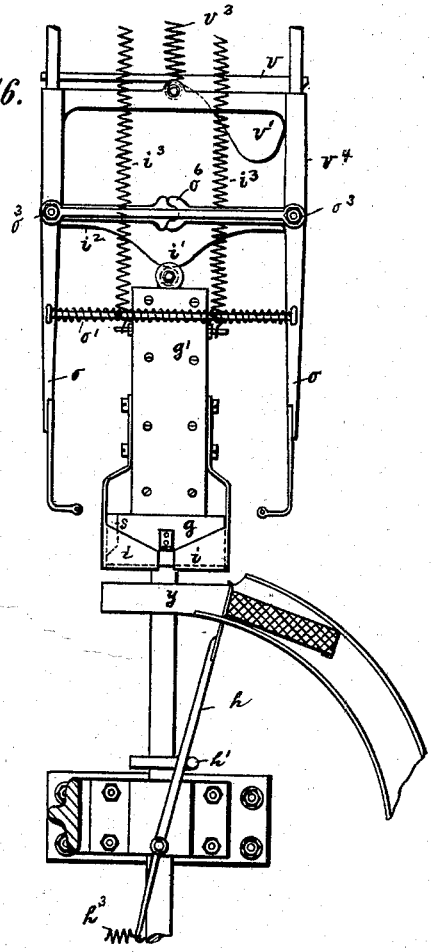
Fig:17.
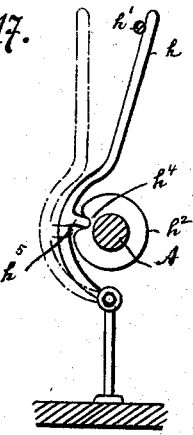
Witnesses:
William Miller
William Schulz
Inventors:
Everard Keunen &
Richard Högfeldt, per
Roeder & Brieren, attorneys
THE NORRIS PETERS CO., PHOTO-LITHO., WASHINGTON, D. C.

UNITED STATES PATENT OFFICE.

EVERARD KEUNEN, OF EINDHOVEN, NETHERLANDS, AND RICHARD HÖGFELDT, OF DUSSELDORF, GERMANY.

BOX-MAKING MACHINE.

SPECIFICATION forming part of Letters Patent No. 608,201, dated August 2, 1898.

Application filed March 11, 1897. Serial No. 626,951. (No model.) Patented in Germany July 30, 1895, No. 90,155; in France August 5, 1895, No. 249,402; in England August 5, 1895, No. 15,063, and in Belgium August 10, 1895, No. 116,951.

*To all whom it may concern:*

Be it known that we, EVERARD KEUNEN, a subject of the Queen of the Netherlands, residing at Eindhoven, Netherlands, and RICHARD HÖGFELDT, a subject of the King of Sweden and Norway, residing at Dusseldorf, Germany, have invented new and useful Improvements in Machines for the Manufacture of Match-Boxes and Similar Cases or Receptacles of Paper, Wood, or other Material, (for which we have obtained the following patents: in Germany, No. 90,155, dated July 30, 1895; in Belgium, No. 116,951, dated August 10, 1895; in France, No. 249,402, dated August 5, 1895, and in England, No. 15,063, dated August 5, 1895,) of which the following is a specification.

This invention relates to a machine for connecting cut strips or blanks and cut bottoms of cardboard or other material by means of pasted bands of paper, &c. The paper band is pasted to the cardboard strip, and then the latter is drawn forward by a tongue and folded around a fixed former corresponding in size and shape to the box to be manufactured. Here the strip is attached to the head by means of the projecting flaps of the pasted paper band, which is folded and pasted to the head, so that a box is completed, of which the cardboard strip forms the sides, while the head forms either the bottom or the cover.

The machine operates as follows: The properly-cut cardboard strips and covers being placed into receptacles B and C and the paper band $z$ being drawn under the paste-pot D, the machine is set in motion. The lowermost cardboard strip is now grasped by a slide $a'$ and is pushed forward until it comes to lie upon the wide-pasted and suitably-ornamented paper band in such a manner that the latter projects beyond both edges of the former. Next the paper band is raised by its supporting-plate $e$, Figures 3 and 4, and pressed against the cardboard strip beneath a shelf $e'$, so that the strip is caused to adhere to the band. During this operation a vertically-movable bar is raised in front of the strip, which raises the projecting flap of the paper band, and then an arm $d^4$, having roller $d^5$, folds the band around the edges of the strip and attaches it thereto. A tongue $f$ of lever $f^3$ now grasps the band $z\ z'$ and draws it forward until it arrives beneath the former $g$. A pair of grippers $k$, arranged beneath the former, next rise along both sides of the same and press the band against the sides of the former, Fig. 6. A pivoted gripper $l$ now advances on top and draws the projecting portion of the band over the former, so that the band is now laid around all the four sides of the same, Fig. 10. During this time the head has been advanced by a slide $m$ and is by lever $n$, having a spring-nose, held and pressed against the front of the box, Fig. 5. Next the spring-arms $o$, carrying rolls, and the arms $p\ p'\ u'$, also carrying rolls, are projected from above and below over the head, Figs. 11 and 15, to press the projecting glued margins of the paper band against the head and attach them to the same. The paper band $z$ is not cut off directly at the edge of the cardboard strip, but at a distance therefrom to form a flap. This flap is by a spring-arm $p'$, actuated by nose $q$ and weight $q'$, pressed downward and attached at the corner $x$, formed by the meeting edges of the paper band. The flap projecting on the top of the box is now pressed inwardly by lever $r$, having plate $r'$, and is by slide $s$ pressed against the inner face of the box, so that an intimate connection between the ends of the cardboard strip is obtained, Figs. 13 and 14. After this operation a frame or stripper $i$, advanced by nose $i'$, pushes the box off the former, and an ejecting-lever $h$ finally throws the box out.

It may be stated that with the box, as well as with the cover, it is not necessary that the paper band be of such a width as to cover the entire side. The band may be made so narrow that it forms at the bottom and at the sides only a narrow strip, while the box may subsequently be covered in suitable manner.

Figure 6:
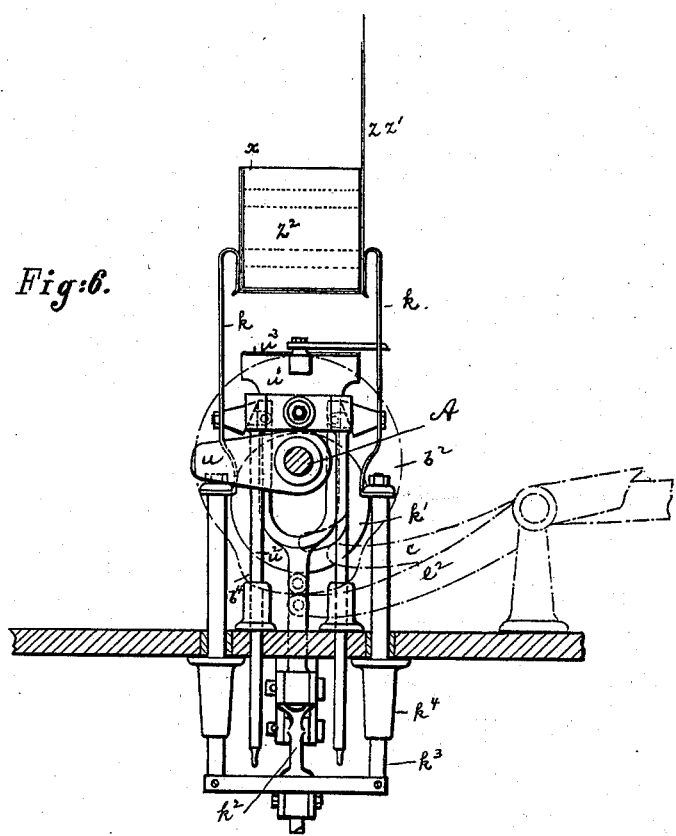
Figure 7:
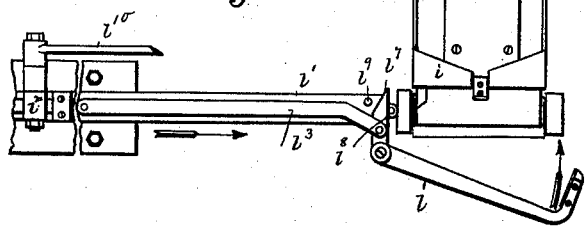
Figure 8:
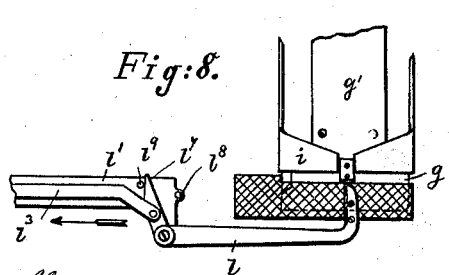

In the accompanying drawings, Fig. 1 is an elevation of the machine; Fig. 2, a plan thereof. Fig. 3 is an elevation of the mechanism for drawing the cardboard strip over the paper band and of the knife-actuating mechanism; Fig. 4, a similar elevation showing the parts in a different position; Fig. 5, a detail of the mechanism for advancing and holding the head $z^2$ against the former; Fig. 6, a detail of the side grippers $k$, showing them raised; Figs. 7 and 8 are details of the upper gripper $l$, showing it in different positions; Fig. 9, a detail of the tongue $f$ and its actuating mechanism; Fig. 10, an end elevation of the machine; Fig. 11, a detail of the mechanism for folding the paper band. Figs. 12 to 14 are details of the mechanism for bending the upper edge of the paper band into the box. Figs. 15 and 16 are details of the grippers $o$, showing them in different positions; and Fig. 17, a detail of the stripper-actuating mechanism.

The paper bands are received within a magazine B, the bottom of which is formed by a slide $a'$, normally drawn back by spring $a^2$. When the machine is started, this slide is drawn forward by lever $b$, Figs. 3 and 4, fulcrumed on standard $b'$ and actuated by nose $b^3$ of cam-disk $b^2$. The slide pushes the lowermost cardboard strip $z'$ upon the advanced paper band $z$, covered with an adhesive, in such a manner that the latter projects at both sides beyond the former, Fig. 3. The forward margin of the band is next elevated by a bar $c^2$, which is raised by lever $c$ and cam $b^2$ and is lowered by its own weight. A nose $d'$ on disk $d$ will now move a lever $d^3$, turning on shaft $d^2$, and cause rolls $d^5$, which are spring-supported on arm $d^4$, to travel over the strip $z'$ and paste the projecting flap of the band $z$ around the outer edges of the same, Fig. 4.

In order to prevent the strip $z'$ from becoming displaced while it is raised by bar $c^2$ and while the rolls $d^5$ pass over the same, it is pressed by table $e$ against an upper shelf or projection $e'$. The table is actuated by lever $e^2$ and cam $b^2$ and descends immediately after the paper $z$ has been turned over and pasted to strip $z'$. The cam $b^2$ serves for actuating the slide $a'$, rail $c^2$, and table $e$, the slide $a'$ being actuated by nose $b^3$ of cam $b^2$ and a lever $b$, which is engaged by the nose and connected to the slide. The lever $e^2$ for actuating the table $e$ engages a rearwardly-extending projection $b^5$ of cam $b^2$. After the two strips $z\ z'$ are connected they are grasped by a tongue $f$, Fig. 9, and are drawn by it underneath the former $g$, Fig. 5. The tongue is actuated by eccentric $f'$, draw-bar $f^2$, and lever $f^3$, turning on shaft $f^6$.

The tongue $f$ opens automatically in advancing and closes in receding. This is effected by two slides $f^4 f^5$, arranged one within the other, and of which the slide $f^4$ is actuated by the eccentric $f'$, bar $f^2$, and lever $f^3$. The slide $f^4$ takes the slide $f^5$ along after it has moved a little forward or backward, and thus the tongue is opened or closed. The tongue $f$ is pivotally connected with slide $f^5$ at $t'$ and farther below with slide $f^4$ at $t^2$. If the tongue is advanced by the machine, the slide $f^4$ will first move alone and will turn the tongue around point $t'$ to open the same. If the tongue is drawn back, the slide $f^4$ will again move alone backward at first until the second jaw $t^3$ of the tongue will rest on slide $f^5$. During this motion the cardboard strip is grasped and is taken along during the further backward motion of the slide. After the strip has been carried to a sufficient distance beneath the former the knife severs the paper band $z$ somewhat back of the paper strip $z'$. The projecting flap of the paper is subsequently used to cover the meeting edges of the cardboard strip, which form one of the corners.

The knife $w$ is advanced by nose $w^2$, Figs. 3 and 4, of cam-disk $w'$ and is drawn back by spring $w^3$. It is pivoted to a lever $w^4$ and bears with a projection $w^5$ upon a table $w^6$. If the knife advances, the projection $w^5$ glides over an inclined plane $w^7$ to raise the knife. After the knife has advanced a sufficient distance it drops off the inclined plane $w^7$ and cuts while falling through the paper beneath.

During the backward movement the inclined plane $w^7$ is tilted upward on its pivot $w^8$ by the projection $w^5$, which slides beneath it. The lever $w^4$, as well as the lever $d^3$, have a common shaft upon which they are mounted.

During the time the machine performs the operation described the head $z^2$ (bottom or cover) of the box has been carried to the former $g$. It is held against the latter by a spring-nose $n'$, while the slide $m$ moves back, Fig. 5. The slide, influenced by spring $n^6$, is actuated by disk $n^4$, having notch $n^5$, Fig. 10, against which bears lever $n^2$, carrying roller $n^3$. To the lever $n^2$ is secured the slide or rod $n$, carrying the nose $n'$, which is pressed against the former by the spring $n^7$.

When the box is ready to be ejected, the lever $n^2$ falls, with its roller $n^3$, into the notch $n^5$ of disk $n^4$, so that the nose $n'$ is by spring $n^6$ drawn back, while the box is thrown off and a new head is advanced.

The movement of the head is effected by the slide $m$, actuated by lever $m'$, turning at $m^2$. Motion is imparted to the lever $m'$ by cam $m^3$, the groove $m^4$ of which is engaged by roll $m^6$ of slide $m^5$, so that the roll reciprocates the lever together with the slide, Figs. 1, 2, 5, and 10. The slide is guided by rod $m^7$, moving in bearing $m^0$. A rod $m^8$ connects the slide $m^5$ with lever $m'$ and compels it, together with slide $m$, to follow the motion of the cam-groove $m^4$. Thus the slide $m$ is advanced at intervals to place at each stroke a head against the former.

After the head has been placed in position the lateral grippers $k$ are raised by eccentric $k'$, lever $k^2$, and rods $k^3$, which move in guides $k^4$, Fig. 6. The grippers by their upward movement turn the cardboard strip up along the sides of the former to form three sides of the box. As soon as the sides of the strip are thus turned up the upper gripper $l$ is advanced. At the commencement of its to-and-fro motion this gripper turns on its pivot and draws the upper end of strip $z\ z'$, projecting beyond the former, Fig. 6, over the latter to form the fourth side of the box, Figs. 7 and 8.

The gripper $l$ is connected to a slide $l'$, actuated by cam $l^6$, Fig. 10, which engages the roller $l^5$ of a lever $l^4$. The lever $l^4$ is by rod $l^{10}$ connected with draw-bar $l^3$, resting on slide $l'$. To the front of the slide is pivoted the gripper $l$, while the draw-bar $l^3$ is connected to the gripper back of pivot $l^2$. When the draw-bar $l^3$ is moved forward, the gripper is turned into the position shown in Fig. 7, while its rear arm $l^7$ will contact with pin $l^8$, so that the slide $l'$ will be taken along. During the backward motion of the draw-bar $l^3$ the gripper will first be turned into the position shown in Fig. 8 until its arm $l^7$ will contact with pin $l^9$, when the gripper will pass behind the upright portion of the paper strip and draw it down during the further return motion, so that the edges of the strip meet at the corner $x$.

A plate $u'$, Figs. 6 and 11, provided with guides $u^2$, is now raised by nose $u$ to press against the paper strip and the former and to simultaneously fold the projecting end of the paper band by means of a spring-rail $u^3$ and paste it to the head, Fig. 11. Simultaneously with this operation a gripper $p$, having spring-roller $p^3$, is moved from above over the head to here paste the paper strip down. The gripper $p$ is attached to a slide $p^2$, actuated by the cam $l^6$, which also actuates gripper $p'$, the motion being transmitted by lever $l^4$, rod $p^4$, lever $p^5$, and link $p^6$ in such a manner that the slide is lowered by the cam and raised by a spring $p^7$. The gripper $p'$ is arranged at the side of gripper $p$ to press the here-projecting end of the paper strip downward and paste it against the covered side of the box, so that the meeting edges of the strip are connected to form a corner, Fig. 11. After this operation has been accomplished the nose $r^2$, mounted on main shaft A, will move arm $r$ to press a plate $r'$, secured to such arm, behind the edge of the box and fold the projecting flap of paper behind the cardboard strip, Figs. 11, 13, and 14. The small slide $s$ is now advanced to press the forwardly-extending flap inwardly and attach it, so that an intimate connection of the parts is effected, Fig. 14. To accommodate the slide $s$, the former $g$ is made with a small notch $g'$, Figs. 12, 14, and 16. The slide is extended rearwardly and is moved forward by angle-lever $s^2$ and cam $s'$, while it is moved backward by spring $s^3$, Figs. 8 and 12. After the ends of the cardboard strip have been connected the lateral grippers $o$, secured to slide $v^4$ and spread apart by spring $o'$, are moved forward. When sufficiently advanced, these grippers are by lever $o^2$ and against the action of spring $o'$ moved toward each other and press with their rollers the laterally-projecting ends of the paper against the bottom or cover of the box, Figs. 15 and 16.

In order to cause a uniform motion of both of the grippers, they are pivoted at $o^3$ and provided with arms $o^4$. One of these arms is formed with a socket $o^5$, while the other arm terminates in a knuckle $o^6$, engaging such socket. Thus the motion of either one of the arms must be followed by the other arm. The grippers $o$ are advanced by projection $v'$ of slide $v$, while a spiral spring $v^3$ draws back the slide $v^4$ with the grippers, such slide being guided by rods $v^5$. After the lateral grippers have been withdrawn the nose $i'$ of disk $i^2$ will advance a slide or stripper $i$, embracing and guided along the former to push the box off the former and upon a table $y$, Figs. 12, 15, and 16. The slide $i$ is then drawn back by spring $i^3$. Upon the table the box encounters the ejecting-lever $h$, which throws it out of the machine. The lever $h$ is drawn forward by spring $h^3$ and falls into a notch $h^4$ of disk $h^2$ as soon as such notch is opposite a nose $h^5$ of lever $h$, so as to toss the box away.

While a box is being ejected a new cardboard strip has been united with a paper band and is grasped and drawn forward by the tongue, so that the formation of a new box will at once begin.

What we claim is—

1. A box-making machine composed of means for attaching a paper band to a strip of cardboard or other material, means for carrying the strip to a fixed former, means for bending the strip around the former, means for feeding and holding a box-head to the former, and means for turning down the projecting ends of the paper band to complete the box, substantially as specified.

2. In a box-making machine, the combination of tongue $f$, for feeding the blank, with slide $m$, for feeding the box-head, a former $g$, grippers $k$, $l$, for bending the blank around the former, means for turning down the projecting ends of the paper covering and attaching them to the box sides and head, and a stripper for stripping the box off the former, substantially as specified.

3. In a box-making machine, the combination of a blank-magazine having a sliding bottom, with a vertically-movable table for supporting the paper covering and the superposed box-blank, a shelf above said table, a vertically-movable bar for turning up the projecting end of the paper covering, and a roller for pressing such end upon the surface of the blank, substantially as specified.

4. In a box-making machine, the combination of a fixed former with a pair of slides $f^4$, $f^5$, engaging one another and of which one is positively driven, and a tongue pivotally connected to both of the slides, all being so constructed that the tongue will open to engage the blank, and will close to draw it under the former, substantially as specified.

5. In a box-making machine, the combination of a pivoted knife having a depending projection with a table upon which the projection is adapted to slide on its return stroke, and a pivoted inclined plane above the table on which the projection is adapted to slide on its forward stroke, substantially as specified.

6. In a box-making machine, the combination of a former with a pivoted slide $m$, for feeding the box-head, a reciprocating slide $m^5$, for actuating the slide $m$, and a rod $n$, having a spring-nose that holds the box-head against the former, substantially as specified.

7. In a box-making machine, the combination of a former with a pair of lateral grippers $k$, for laying the blank around the sides of the former, a pivoted upper gripper $l$, for laying the blank around the top of the former, and means for throwing the upper gripper outwardly while advancing and inwardly while receding, substantially as specified.

8. In a box-making machine, the combination of a former with a lower plate $u'$, upper gripper $p$, lateral gripper $p'$, and interlocked spring-arms $o$, for folding the paper strip against the sides and head of the box, substantially as specified.

9. In a box-making machine, the combination of a notched former with a slide $s$, engaging the same, and with arms $r$, having plate $r'$, for folding the paper strip into the box, substantially as specified.

10. A box-making machine composed of means for attaching a paper band to a strip of cardboard or other material, means for carrying the strip to a fixed former, means for bending the strip around the former, means for feeding and holding a box-head to the former, means for turning down the projecting ends of the paper band to complete the box, and a stripper embracing the former and adapted to push the box off the same, substantially as specified.

In testimony whereof we have signed our names to this specification in the presence of two subscribing witnesses.

EVERARD KEUNEN.
RICHARD HÖGFELDT.

Witnesses:
WM. ESSENWEIN,
ERNEST ANDRÉ.